Dec. 27, 1960 J. M. KATZFEY 2,966,178
DRIVE MECHANISM FOR POWER SAW
Filed Feb. 13, 1958 4 Sheets-Sheet 1
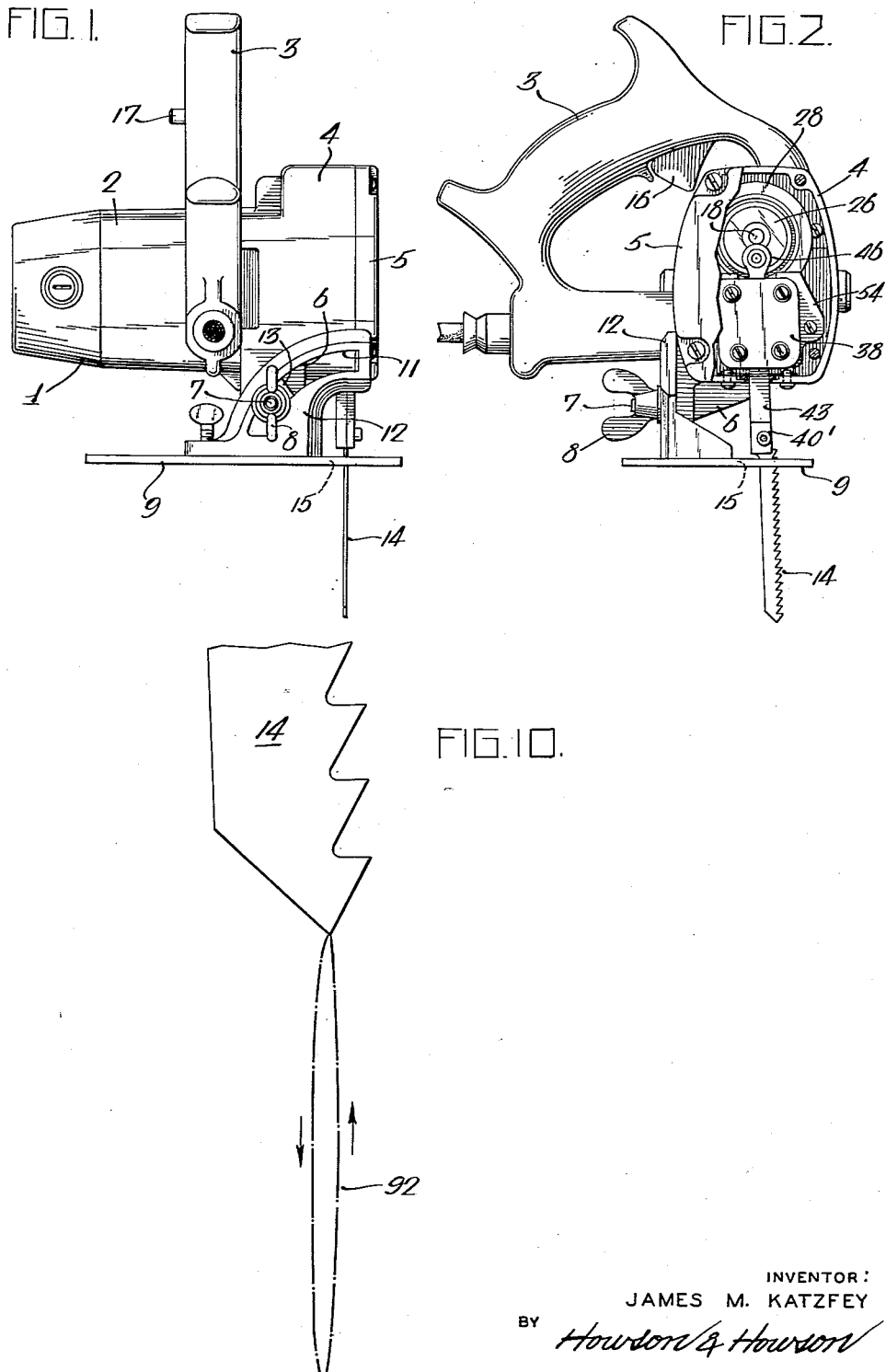
INVENTOR:
JAMES M. KATZFEY
BY Howson & Howson
ATTYS, Dec. 27, 1960   J. M. KATZFEY   2,966,178
DRIVE MECHANISM FOR POWER SAW
Filed Feb. 13, 1958   4 Sheets-Sheet 2
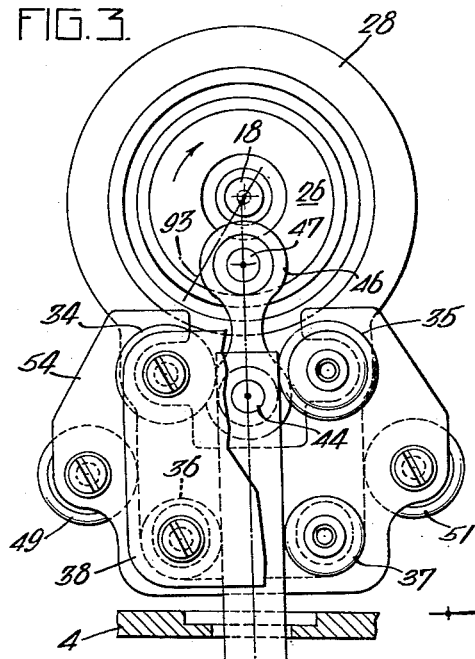
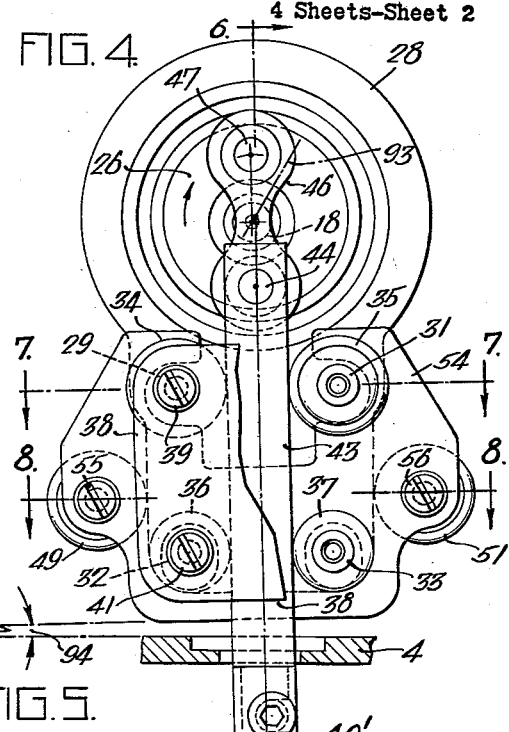
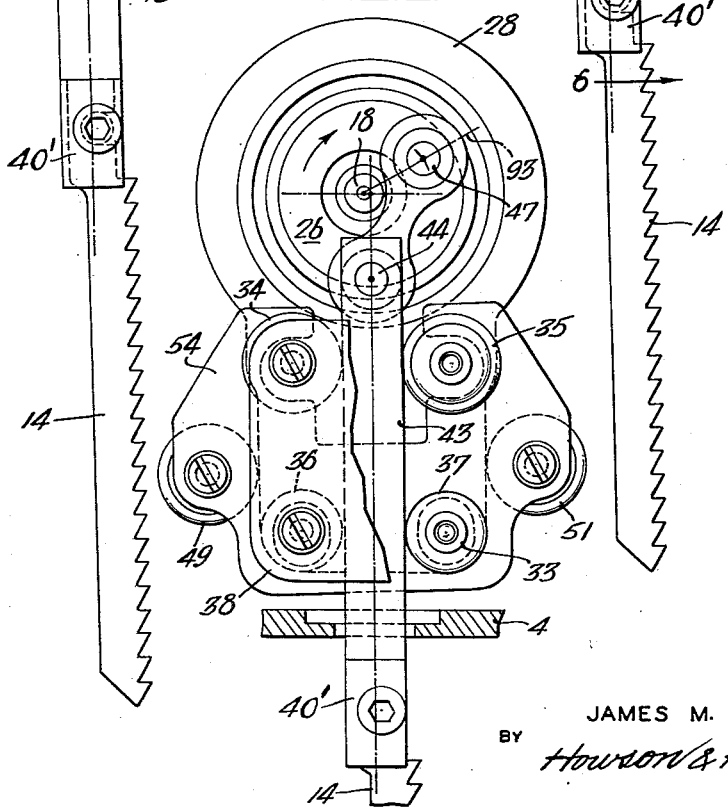
INVENTOR:
JAMES M. KATZFEY
BY Howson & Howson
ATTYS.

Dec. 27, 1960 J. M. KATZFEY 2,966,178
DRIVE MECHANISM FOR POWER SAW
Filed Feb. 13, 1958 4 Sheets-Sheet 3
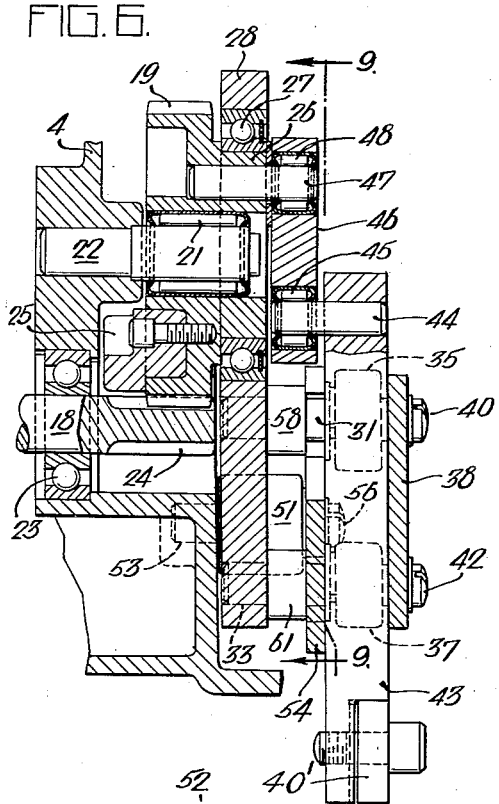
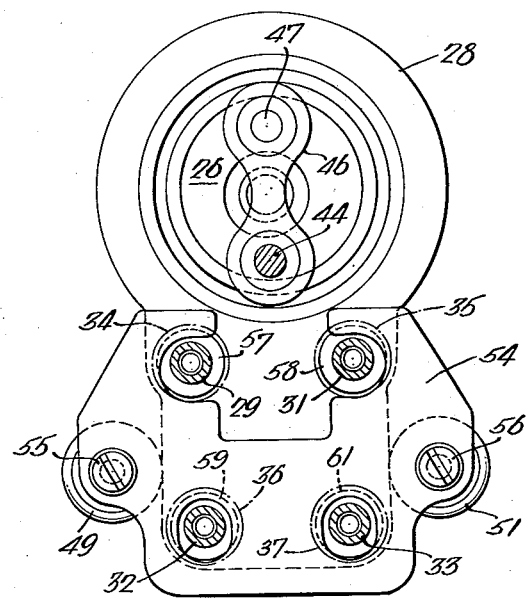
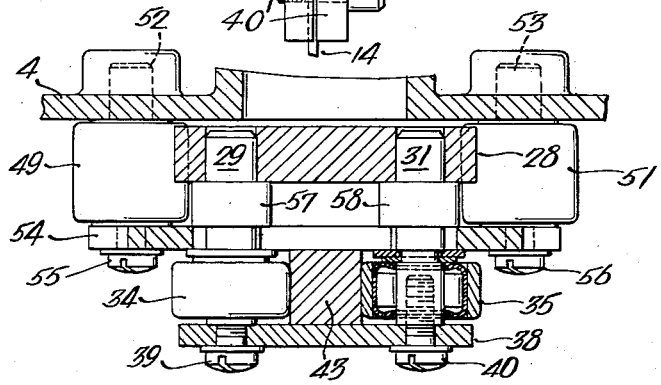
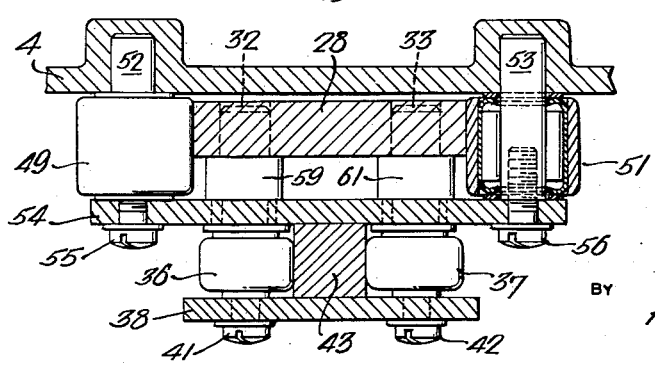
INVENTOR:
JAMES M. KATZFEY
BY Howson & Howson
ATTYS.

Dec. 27, 1960 J. M. KATZFEY 2,966,178
DRIVE MECHANISM FOR POWER SAW
Filed Feb. 13, 1958 4 Sheets-Sheet 4
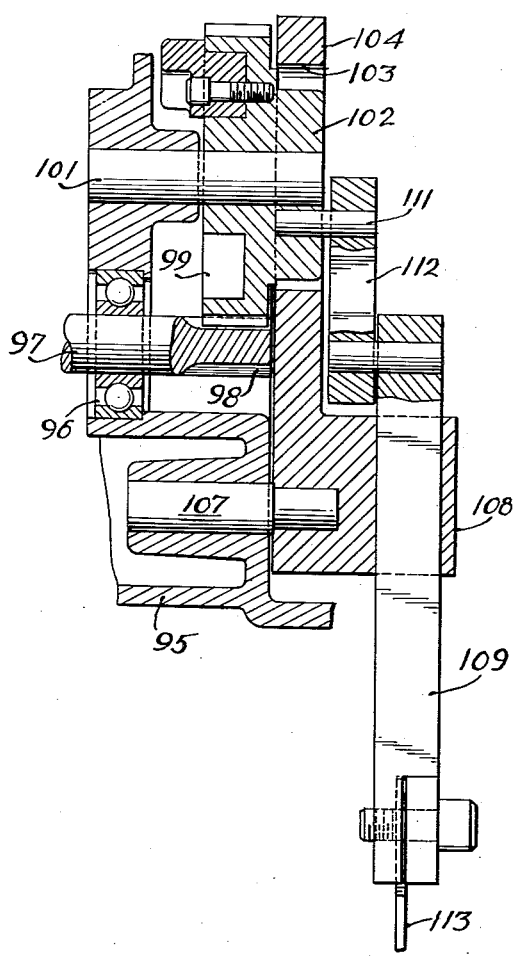
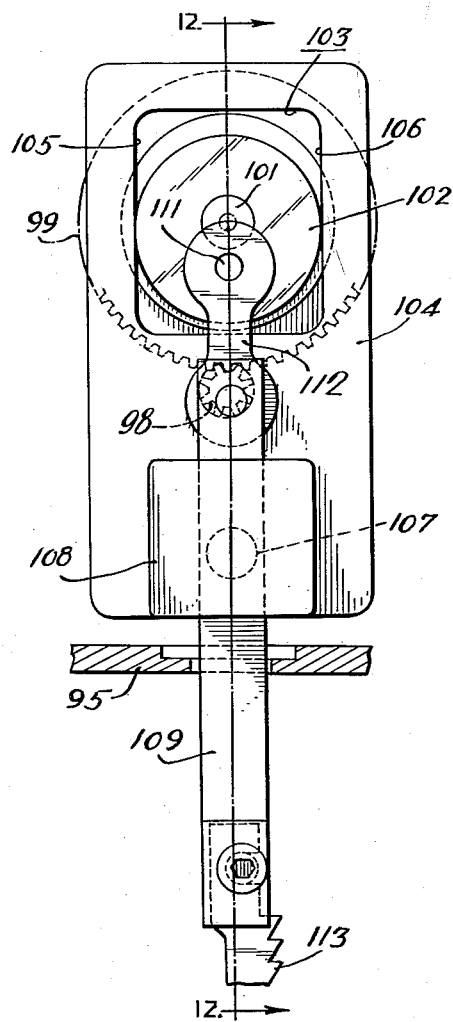
INVENTOR:
JAMES M. KATZFEY
BY Howson & Howson
ATTYS.

United States Patent Office 2,966,178
Patented Dec. 27, 1960

2,966,178
DRIVE MECHANISM FOR POWER SAW

James M. Katzfey, Jenkintown, Pa., assignor to H. K. Porter Company, Inc., a corporation of Delaware Filed Feb. 13, 1958, Ser. No. 715,014

4 Claims. (Cl. 143—68)

This invention relates to electric hand saws of the saber type and a primary object of the invention is to provide a saw of relatively simple and compact form and mechanism and of high functional efficiency.

More specifically stated, a primary object of the invention is to provide novel blade control mechanism which in addition to the conventional function of longitudinally reciprocating the saw blade also serves to move the blade in a relatively flat orbital path which favorably affects the cutting operation.

The invention resides also in certain structural and mechanical features and details hereinafter described and illustrated in the attached drawings wherein:

Fig. 1 is a rear elevational view of the saw;

Fig. 2 is a side elevational view of the saw with a part of the housing cut away to show the operating mechanism;

Fig. 3 is a fragmentary sectional elevational view of the blade operating and control mechanism showing the parts in positions corresponding to maximum saw blade extension;

Fig. 4 is a corresponding view showing the parts in positions corresponding to maximum blade retraction;

Fig. 5 is a corresponding view showing the parts in an intermediate position between maximum extension and retraction;

Fig. 6 is a sectional view on the line 6—6, Fig. 4;

Fig. 7 is a sectional view on the line 7—7, Fig. 4;

Fig. 8 is a sectional view on the line 8—8, Fig. 4;

Fig. 9 is a sectional view on the line 9—9, Fig. 6;

Fig. 10 is a diagrammatic view showing the outer end of the saw blade and indicating the orbital movement of the blade;

Fig. 11 is a fragmentary sectional elevational view illustrating a modified form of blade operating and control mechanism within the scope of the invention; and Fig. 12 is a sectional view on the line 12—12, Fig. 11.

With reference to the drawings the saw comprises a casing 1 which includes a housing 2 for an electric motor constituting the prime mover of the saw; a handle 3 of the pistol grip type commonly used in hand saws; and, at the opposite side of said handle from the motor housing 2, a housing 4 for the blade actuating and control mechanism. This latter housing comprises a detachable cover plate 5 affording access to the said actuating and control mechanism. The casing 1 also has at the under side thereof, a bracket 6 to which is adjustably secured by a bolt 7 and wing nut 8, a work-contract shoe 9. The screw 7 extends through an arcuate slot 11, in a bracket 12 attached to and extending upwardly from the top of the shoe 9, and at the base of the screw the bracket 6 carries an arcuate lug 13, see Figure 1, which fits slidably into the slot 11 to guide the shoe in its adjustment movement. By releasing the nut 8 the shoe may be adjusted to various angles relative to the plane of cut in obvious manner.

As shown in Figures 1 and 2 the saw blade 14 extends downwardly through a slot 15 in the forward end of the shoe, and adjustment of the shoe as described above acts to adjust the angle between the plane of the blade and the under or work-contacting face of the shoe, and thereby the angle of the cut relative to the surface of the work on which the shoe rests. As also shown in Figures 1 and 2, the handle 3 carries a trigger 16 operatively associated with a switch (not shown) for control of the aforesaid motor; and a button 17 at the side of the handle, operatively associated with the trigger, acts when pressed to latch the trigger in retracted or switch-closing position when continuous operation of the saw independently of manual pressure on the trigger is desired.

As previously indicated the elements of the saw blade actuating and control mechanism are mounted within the housing 4, as shown in Figure 6. This mechanism comprises a shaft 18 which connects the motor in housing 2 with a gear 19 journalled through the medium in the present instance of an anti-friction bearing 21 on a pin 22 secured in the inner wall of the housing 4 as indicated. The shaft 18 is supported in an anti-friction bearing 23 in the housing wall and has at its inner end a pinion 24 which meshes with the gear 19. As indicated the gear 19 carries a counterweight 25.

The gear 19 comprises a hub 26 which is slightly eccentric to the axis of the pin 22 for a purpose hereinafter described, and suspended from this eccentric hub 26 through the medium of an anti-friction bearing 27 is a yoke 28, as shown in Fig. 6. Projecting from the forward face of the lower depending portion of the yoke 28 are four pins 29, 31, 32 and 33, each of which carries at its outer end a roller, 34, 35, 36 and 37 respectively. These rollers are confined to the outer end of the studs by a face plate 38 which is held in place by screws 39, 40, 41 and 42 passing through the face plate and threaded into the outer ends of the respective pins 29, 31, 32 and 33.

The rollers jointly constitute a guide for a bar 43 the lower end of which has a chuck 40' for the saw blade 14. From its upper end the bar 43 is suspended from a pin 44 secured in anti-friction bearings 45 in a rod 46 which connects the bar to a crank pin 47 in the hub of the gear 19, an anti-friction bearing 48 being interposed between the pin and the connecting rod as best shown in Figure 6. As the gear 19 is rotated the crank 46 will act to longitudinally reciprocate the bar 43 between the rollers 34, 36 and 35, 37. Simultaneously with the reciprocation of the saw blade carrier 43 the yoke 28 will be oscillated about the axis of the crank in the pin 22 by action of the eccentric hub 26 on which the yoke is suspended. The lower end of the yoke 28, shown in dotted lines in the several figures, lies between two guide rolls 49 and 51 which, as best shown in Figure 8, are journalled on pins 52 and 53 respectively fixed in the inner wall of the housing 4. The rolls are confined to their pins in this case by a plate 54 which is attached by screws 55 and 56 to the outer ends of the pins 52 and 53. This plate seats slidably against collars 57, 58, 59 and 61 on the pins 29, 31, 32 and 33 respectively and, as shown in Figure 9, the plate is cut away around the said pins to afford clearance for tilting movement of the yoke 28 between the confining rollers 49 and 51. By reason of this confinement of the yoke 28 between the rollers 49 and 51 the small orbital movement of the yoke on the eccentric 26 is converted into a slight oscillatory movement about the crank axis which as set forth above, corresponds to the axis of the pin 22. Thus simultaneously with the reciprocation of the blade carrier 43 the carrier will be given a slight oscillatory movement, the two movements of reciprocation and oscillation resulting in a movement of the carrier in a narrow orbital path between the confining plates 38 and 54.

The nature of the orbital movement, which is transmitted to the blade 14, is illustrated at 92 in Figure 10. It will be noted that in its upward or working stroke, the blade will move in a relatively flat orbital path across the face of the work, the movement having a minor lateral component toward the work. In the return stroke the movement has a reverse lateral component of a retractive nature with respect to the work. By adjusting the throw of the eccentric member 26 with respect to the crank pin dead center positions, it is possible to vary the form of the orbital path, and by then slightly adjusting the position of the plate 54 about the axis of the oscillatory movement of yoke 28 as indicated the position of the longitudinal axis of the orbit with respect to the work engaging face of shoe 9, and therefore in effect with respect to the work may be varied and a blade movement of optimum effectiveness can be obtained. I have found that for general purposes a relationship of crank pin and eccentric such as that illustrated, accompanied by the indicated slight misalignment of the rollers 49 and 51 from a symmetrical position with respect to the shoe 4, affords satisfactory results. In this case maximum throw of the eccentric leads the crank pin by approximately thirty degrees as indicated by the broken lines 93; and the angular offset of the rolls 49 and 50, as indicated by angle 94, Figure 4, is approximately five degrees and in the direction of the cutting edge of the blade. It will be understood, however, that the invention is not limited to a particular relative setting of the parts and resides in part in the ability afforded by the assembly to vary the nature of the movement of the blade in accordance with particular work requirements.

In the embodiment of the invention illustrated in Figs. 11 and 12, the housing is indicated by reference numeral 95. As in the previously described form of the machine, the housing contains a bearing 96 for a motor shaft 97 the inner end of which is formed as a toothed pinion 98. This pinion meshes with a gear 99 which is journaled on a pin 101 in the housing and which carries an eccentric disc 102. This disc engages in an opening 103 in a yoke 104, the engagement in this case being limited to the sides 105 and 106 of the opening. In this case also the yoke is mounted on a pivot pin 107 fixed in the housing so that the motion of the yoke under actuation by the eccentric 102 is a purely oscillator one about the axis of the pin. The yoke carries a guide 108 for a blade carrier 109 which receives a longitudinal reciprocatory movement through a crank 111 on the disc 102 and a connecting link 112. The movement of the carrier 109 and of the blade 113 is thus combined of the oscillatory movement of the guide 108 and the reciprocatory movement generated by the aforesaid crank. This embodiment has an obvious advantage of relative simplicity and low cost of production.

I claim:

1. A motor saw comprising a cutting blade, a housing, an eccentric drive member rotatably mounted in said housing, drive means extending into said housing operable to impart rotary movement to said eccentric drive member, a yoke positioned in said housing, yoke mounting means carried by said housing in engagement with one end of said yoke mounting said yoke for rocking movement relative to said housing, the other end of said yoke being interconnected with said eccentric drive member to oscillate said yoke about said yoke mounting means, a crank member positioned within said housing interconnected with said drive means, a cutting blade carrier having means at one end thereof for securing the cutting blade to the carrier and having the opposite end thereof interconnected with said crank pin, and guide means on said yoke in engagement with said cutting blade carrier operable to limit movement of said cutting blade carrier relative to said yoke along a straight path extending axially of said cutting blade carrier.

2. Apparatus in accordance with claim 1 wherein the means mounting said yoke for rocking movement in said housing comprises a floating pivot in engagement with said one end of said yoke.

3. Apparatus in accordance with claim 1 wherein the means mounting said yoke for rocking movement in said housing comprises a member fixed to said housing and pivotally received in said one end of said yoke.

4. Apparatus in accordance with claim 1 wherein said crank pin is secured to said eccentric drive member and wherein the maximum throw of the eccentric drive member leads the crank pin and is offset from the crank pin by an acute angle.

References Cited in the file of this patent

UNITED STATES PATENTS

| 78,443 | Ehlers | June 2, 1868 |
| 1,609,651 | McMillan | Dec. 7, 1926 |
| 1,707,097 | Ruschke | Mar. 26, 1929 |
| 1,855,371 | Ungar | Apr. 26, 1932 |
| 2,432,562 | Dill | Dec. 16, 1947 |
| 2,547,922 | Bechtold | Apr. 10, 1951 |
| 2,884,789 | Frostad | May 5, 1959 |

FOREIGN PATENTS

| 1,032,269 | France | Mar. 25, 1953 |